United States Patent [19]

Lambert et al.

[11] Patent Number: 5,698,857
[45] Date of Patent: Dec. 16, 1997

[54] (BARIUM HAFNATE: CU) PHOSPHORS AND PHOSPHOR SCREENS

[75] Inventors: Patrick Maddock Lambert, Rochester; Gregory S. Jarrold, Henrietta; David Paul Trauernicht, Rochester, all of N.Y.

[73] Assignee: Eastman Kodak Company, Rochester, N.Y.

[21] Appl. No.: 574,507

[22] Filed: Dec. 19, 1995

[51] Int. Cl.$^6$ .................................. C09K 11/67
[52] U.S. Cl. .................. 250/483.1; 252/301.4 F
[58] Field of Search .............. 250/483.1; 252/301.4 F

[56] References Cited

U.S. PATENT DOCUMENTS

| | | | |
|---|---|---|---|
| 2,542,336 | 2/1951 | Kröger. | |
| 4,961,004 | 10/1990 | Bryan et al. | 252/301.4 F |
| 4,972,086 | 11/1990 | Bryan et al. | 252/301.4 F |
| 4,972,516 | 11/1990 | Bryan et al. | 252/301.4 F |
| 4,980,559 | 12/1990 | Bryan et al. | 252/301.4 F |
| 4,994,205 | 2/1991 | Bryan et al. | 252/301.4 F |
| 5,112,700 | 5/1992 | Lambert et al. | 428/690 |
| 5,173,611 | 12/1992 | Lambert et al. | 252/301.4 F |

OTHER PUBLICATIONS

Some Aspects of the Luminescence of solids, F. A. Kroger, Elsevier, Amsterdam (1948), p. 161.

A New Family of Self-activated Phosphors, D. E. Harrison et al., J. Electrochem. Soc. vol., 110 (1), 1963 pp. 23–28.

Fluorescence of $Eu^{2+}$-Activated Silicates, G. Blasse, et al., Philips Res. Repts., vol. 23, 1968 pp. 189–200.

Energy Transfer in Oxidic Phosphors, G. Blasse, Philips Res. Repts., vol. 24, 1969 pp. 131–144.

Investigations on the Luminescence of Titanium-Activated Stannates and Zirconates, A.J.H. Macke, J. Solid State Chem., vol. 18, 1976 pp. 337–346.

On the Luminescence of Hafnium Compounds, W. J. Schipper, et al., Mat. Res. Bull., vol. 29, 1994 pp. 23–30.

Proprietes de Luminescence des zirconates alcalinoterreux purs ou actives par l'ion $Pb^{2+}$, J. Chanewayne et al., C. R. Acad. Sc. Paris, vol. 271, 1970 p. 486.

Influence of Crystal Structure on the Luminescence of Ions with $s^2$ Configuration, G. Blasse, et al., J. Solid State Chem., vol. 20, 1977 pp. 63–65.

Primary Examiner—David P. Porta
Assistant Examiner—Richard Hanig
Attorney, Agent, or Firm—Carl O. Thomas

[57] ABSTRACT

(Barium halfnate:Cu) phosphors and phosphor screens. The phosphor screens include a support and a luminescent portion. The phosphor includes oxygen and a combination of species characterized by the relationship: $(Ba_{1-q}M_q)(Hf_{1-z-e}Zr_zMg_e):yT$ where M is selected from the group consisting of Ca and Sr and combinations thereof; T is Cu; q is from 0 to 0.15; z is from 0 to 1; e is from 0 to 0.10; z+e is from 0 to 1; and y is from $1 \times 10^{-6}$ to 0.02.

22 Claims, 1 Drawing Sheet

(BARIUM HAFNATE: CU) PHOSPHORS AND PHOSPHOR SCREENS

CROSS-REFERENCE TO RELATED APPLICATION

This application is related to a U.S. Ser. No. 08/574,481, entitled: "(BARIUM HAFNATE:Ti,Ce,Pb) PHOSPHORS, PHOSPHOR SCREENS, AND PHOSPHOR PREPARATION METHODS", filed concurrently herewith, by Patrick M. Lambert, Gregory S. Jarrold, and Philip S. Bryan; which is hereby incorporated herein by reference.

FIELD OF THE INVENTION

The invention relates to phosphors and phosphor screens and more particularly relates to improved activated barium hafnate phosphors and screens including those phosphors.

BACKGROUND OF THE INVENTION

Phosphors have long been used in a variety of articles that can be referred to as "phosphor screens" or "phosphor-based radiation converters", articles that include a support and a phosphor-containing luminescent portion, and function to screen or capture X-rays and other high energy radiation for emission at a longer wavelength, either immediately or on a delayed basis following secondary stimulation. Information represented by the modulation of the captured radiation is reproduced in the emitted longer wavelength radiation. (As a matter of convenience, these articles are referred to generically herein as "phosphor screens" or "screens". Specific types of phosphor screens are further identified herein by commonly used designations, for example, "intensifying screens", "storage screens", "scintillators".)

Many types of phosphor screen are used to detect image-wise X-radiation absorption by a target interposed between the phosphor screen and an X-ray source. A widely used variety of phosphor screen is a radiographic phosphor panel or screen. These articles are rigid or flexible sheet or plates having a thin luminescent layer that contains a radiographic phosphor. Flexible radiographic phosphor screens are generally exposed while flat, but can be utilized while bent into a cylinder or more complex shape, particularly for industrial applications. Like many other crystalline materials, radiographic phosphors have a crystal matrix which allows for the replacement of some atoms by other similar atoms, but does not readily accept other atoms or moieties. Radiographic phosphor screens can be classified, based upon their phosphors, as prompt emission screens and image storage screens.

Intensifying screens are the most common prompt emission screens. Intensifying screens are used to generate visible light upon exposure of the intensifying screen to X-radiation. A sheet of photographic film is positioned to intercept the visible light generated and commonly is pressed against the intensifying screen within a light-tight cassette. Other prompt emission screens operate similarly, but in place of the photographic film have some other means for visualizing the X-radiation.

In intensifying screen/film technology, there is a need for efficient phosphors that absorb X-radiation and emit longer wavelength light in spectral regions matching native silver halide sensitivity. A developable latent image is formed in a silver halide emulsion layer of a radiographic element when it is imagewise exposed to radiation. Silver halide emulsions, however, more efficiently absorb and, consequently, are more responsive to longer wavelength electromagnetic radiation than to X-radiation. Silver halides possess native sensitivity to both the near ultraviolet and blue regions of the spectrum. Consequently, it is accepted practice to employ intensifying screens in combination with silver halide emulsion layers. An intensifying screen contains on a support a fluorescent layer that absorbs the X-radiation more efficiently than the silver halide and emits to the adjacent silver halide emulsion layer longer wavelength electromagnetic radiation in an image wise pattern corresponding to that of the X-radiation received. While the phosphor layer and the emulsion layer can be integrated into one element, in most instances the adjacent silver halide layer is coated on a separate support to form a separate radiographic element. In this way, the intensifying screen, which is not permanently altered to any significant degree by exposure, can be reused. The most common arrangement for X-radiation exposure is to employ a dual coated radiographic element (an element with silver halide emulsion layers on opposite sides of a support); each emulsion layer being mounted adjacent a separate intensifying screen.

The useful native sensitivity (i.e., maximum absorption capability) of silver halide emulsions lies in the near ultraviolet (300–400 nm) and blue (400–500 nm) portions of the spectrum. The native sensitivity of silver chloride is negligible beyond 450 nm, with the sensitivity dropping approximately 2 orders of magnitude between 380 and 420 nm. The native sensitivity of silver bromide is negligible beyond 500 nm, with sensitivity dropping approximately 2 orders of magnitude between 450 and 490 nm. The native sensitivity of silver bromoiodide (3 mole % iodide) is negligible beyond 550 nm, with sensitivity dropping approximately 2 orders of magnitude between 470 and 530 nm. Thus, not only do silver halides fail to absorb efficiently in the green portion of the spectrum, the absorption of silver halides in the longer wavelength regions of the blue spectrum is relatively limited.

Green-emitting intensifying screens have found wide application with silver halide emulsions, however, this requires the sensitization of the silver halide by adsorbed spectral sensitizing dyes. The disadvantages of such a systems include added expense, since the dyes are complex organic compounds which, on a weight basis, are more expensive than silver, and are not recoverable for reuse. Also, emulsion addenda that adsorb to silver halide grain surfaces, such as antifoggants and stabilizers, can displace the dyes, leading to reduced spectral sensitivity.

High density X-ray phosphors are also particularly desired in screen/film systems to deliver improved image quality. The X-ray absorbing properties of these phosphors allow the construction of thinner screens, which, because of the shorter total path length to the adjacent silver halide emulsion layer(s), yield less blurring or spreading of the X-ray image. For a given phosphor particle size, an increase in image sharpness is apparent. Alternatively, the thickness of the phosphor layer can remain unchanged and the quantum noise of the system improved by increased X-ray absorption.

Scintillators utilize prompt emitting phosphor crystals of large or relatively large size. These phosphor screens can be flat or can have complex shapes, and sometimes utilize only a single very large crystal. Scintillators are used in high energy physics and medical applications. The material demands usually include the following:

1) High luminescence response to incident radiation or particles. Only in the case of the electromagnetic calorimeters used for high-energy physics experimentation is this requirement relaxed. The emission wavelength should be matched to the detector response (photomultipliers, proportional counters, Si photodiodes). For example, high energy physics calorimeters require only that $lamda_{em}>300$ nm, while integrating techniques such as CT require $lamda_{em}>450$ nm.

2) Very rapid relaxation times. For example, in high energy calorimeters, decay times of less then 20 ns are required, while in positron emission tomography (PET) relaxation times must be <1 ns. Other applications, such as computed tomography (CT) and gamma-ray cameras have less stringent decay time requirements (up to 100's of microseconds).

3) High radiation stopping power for size minimization. Materials with low-stopping power are needed as large pieces, in some cases single crystals up to 25 cm in length are required.

4) High transmittance. Crystals of excellent optical clarity are generally needed so that the majority of the emitted light can be conveniently collected at an edge or face of the element.

5) Low afterglow. This is particularly important in CT systems.

6) Good radiation hardness.

The scintillators are usually coupled to light detectors such as photomultipliers or silicon photodiodes. For example, in computed tomography, a rotating, fan-shaped X-ray beam transects the patient, and then interacts with the scintillator element, which, in turn, is coupled to a Si photodiode with a maximum response in the 500–1000 nm range. The emitted light is then proportional to the incident X-ray. The scintillator elements can be fashioned as single crystals, or as sintered polycrystalline pieces of high optical clarity.

*Some Aspects of the Luminescence of Solids*, F. A. Kroger, Elsevier, Amsterdam (1948) p. 161, teaches that a $BaZrO_3$ host showed no luminescence at room temperature or −180° C. "A New Family of Self-activated Phosphors", D. E. Harrison, et al., *J. Electrochem. Soc.*, Vol. 110 (1), (1963) pp. 23–28 describes $BaZrO_3$ (and another material) as "non luminescent compounds".

"Fluorescence of $Eu^{2+}$-Activated Silicates", G. Blasse, et al., *Philips Res. Repts.*, Vol. 23, (1968) pp. 189–200 teaches that $BaZrO_3:Eu^{2+}$ exhibits a broad green prompt luminescence (centered at approximately 495 nm) and that this is an example of an emission with $Eu^{2+}$ in a cubic site. "Energy Transfer in Oxidic Phosphors", G. Blasse, *Philips Res. Repts.*, Vol. 24, (1969) pp. 131–144 teaches as to $BaZrO_3:Eu^{2+}$ that: "As the luminescence of $BaZrO_3:Eu^{2+}$ is very weak, neither the value of $x_c$ nor of $t_s$ has been determined." "On the Luminescence of Hafnium Compounds", W. J. Schipper, et al., *Mat. Res. Bull.*, Vol. 29, (1994) pp. 23–30 discloses that the "efficient" green luminescence reported for a $BaZrO_3:Eu^{2+}$ could not be reproduced.

*Some Aspects of the Luminescence of Solids*, F. A. Kroger, Elsevier, Amsterdam (1948) p. 161, teaches that $BaZrO_3$ activated with 1 mole percent titanium showed deep blue luminescence at −180° C., but no emission at room temperature. U.S. Pat. No. 2,542,336 to Kroger et al., teaches phosphors containing titanium as an activator and having a matrix composed of one or more of the oxides of zirconium, hafnium, thorium, germanium and tin and optionally including either acid oxides or basic oxides or both. Disclosed basic oxides are the oxides of sodium, potassium, rubidium, cesium, lithium, barium, calcium, strontium, magnesium, beryllium, and zinc. Disclosed acid oxides are $SO_3$, $B_2O_3$, $P_2O_5$ and $SiO_2$. Titanium-activated zirconium oxide, magnesium stannate, calcium zirconate and zirconium phosphate are each specifically disclosed. "Investigations on the Luminescence of Titanium-activated Stannates and Zirconates", A. J. H. Macke, *J. Solid State Chem.*, Vol. 18, (1976) pp. 337–346 discloses a study of the luminescence of $BaZr_{0.99}Ti_{0.01}O_3$. A broad emission centered at 2.87 eV (432 nm) was observed, but only at or below liquid nitrogen temperature. "On the Luminescence of Hafnium Compounds", W. J. Schipper, et al., *Mat. Res. Bull.*, Vol. 29, (1994) pp. 23–30 teaches that a violet-blue emission was observed (at 410 nm) at 4.2° K for $BaHfO_3:Ti$. The emission was not observed at temperatures above about 250° K. The article also states: "$HfO_2$ and $BaHfO_3$ do not luminesce .. . Upon doping with Ti, emission in the blue spectral region appears, except for $HfP_2O_7:Ti$. The titanate luminescence is largely quenched at room temperature, limiting the use of these materials as X-ray or X-ray storage materials."

"Propriétés de luminescence des zirconates alcalinoterreux purs ou activés par l'ion $Pb^{2+}$", J. Chanewaye, et al., *C. R. Acad. Sc. Paris*, Vol. 271, (1970) p. 486 discloses a study of zirconates of the type $MZrO_3$ with and without $Pb^{2+}$ at 77° K. The $BaZrO_3$ host showed a broad emission at 424 nm at this temperature and $Pb^{2+}$ activated host material showed a very broad emission at approximately 580 nm. $CaZrO_3:Pb^{2+}$ was cited as the most intense of the lead-activated compounds, with a severe intensity decrease observed at room temperature. "Influence of Crystal Structure on the Luminescence of Ions with $s^2$ Configuration", G. Blasse, et al., *J. Solid State Chem.*, Vol. 20, (1977) pp. 63–65 discloses that $BaZrO_3:Pb^{2+}$ exhibited a green luminescence (centered at 495 nm) at 77° K. The luminescence was quenched at 260K.

U.S. Pat. No. 4,994,205 to Bryan, et al. teaches the phosphor $HfO_2:Ti$ and an intensifying screen for producing a latent image in a silver halide radiographic element when imagewise exposed to X-radiation. The screen contains a phosphor having a hafnia host containing zirconia in concentrations higher than those found in optical grade hafnia. The phosphor can include as an activator one or a combination of titanium, rare earth, and alkali metal ions. Phosphor preparation processes are also described.

U.S. Pat. No. 5,112,700 to Lambert, et al. teaches the phosphor $HfGeO_4:Ti$. The titanium activated Hf—Zr germanate phosphor disclosed emits electromagnetic radiation principally in the spectral region to which silver halide exhibits native sensitivity. To maximize the intensity of emission the ratio of host metals satisfies the relationship:

where D is the combined sum of zirconium and hafnium and x is 0.25 to −0.70. An X-ray intensifying screen is disclosed containing the phosphor composition.

There is a continuing need for improved phosphors and phosphor screens in which high density phosphors can exhibit prompt emissions of secondary radiation in useful wavelength ranges and with good speed.

SUMMARY OF THE INVENTION

The invention is defined by the claims. The invention, in its broader aspects, provides (Barium hafnate:Cu,Eu,Dy,Sm, Ho,Er,Tm) phosphors and phosphor screens. The phosphor screens include a support and a luminescent portion. The phosphor includes oxygen and a combination of species characterized by the relationship:

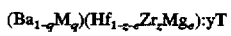

where M is selected from the group consisting of Ca and Sr and combinations thereof; T is selected from the group consisting of Cu, Eu, Dy, Sm, Ho, Er, and Tm and combinations thereof; q is from 0 to 0.15; z is from 0 to 1; e is from 0 to 0.10; z+e is from 0 to 1; and y is from $1\times 10^{-6}$ to 0.02.

It is an advantageous effect of at least some of the embodiments of the invention that improved phosphors and phosphor screens are provided which can exhibit prompt emissions of secondary radiation in useful wavelength ranges and with good speed.

BRIEF DESCRIPTION OF THE FIGURES

The above-mentioned and other features and objects of this invention and the manner of attaining them will become more apparent and the invention itself will be better understood by reference to the following description of embodiments of the invention taken in conjunction with the accompanying figures wherein.

DESCRIPTION OF THE PREFERRED EMBODIMENTS

Figure 1:
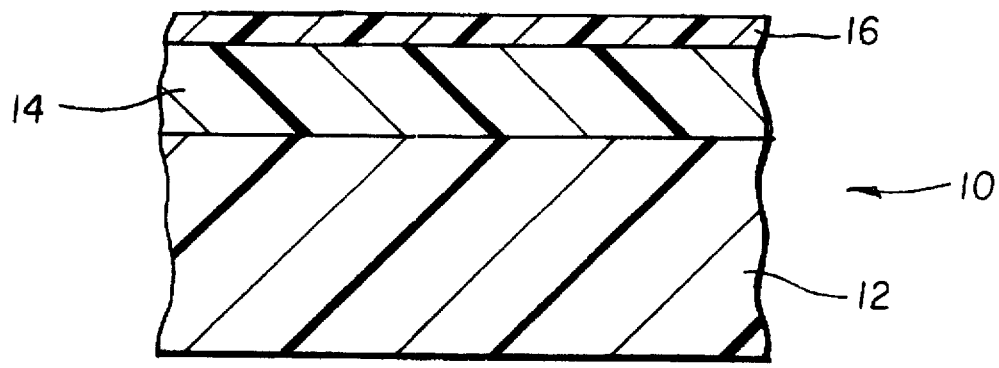
FIG. 1 is a diagrammatical cross-section of an embodiment of the phosphor screen of the invention configured as a radiographic phosphor screen.

The phosphor screen of the invention is an article of manufacture that includes a support and a phosphor-containing luminescent portion. The phosphor screen is generally described herein as if the phosphor screen were in the shape of a horizontally disposed flat plate. It is to be understood, however, that the phosphor screen is not limited to any particular shape and that directional terms refer only to relative positions, not an absolution orientation relative to the environment. For example, in different embodiments, the phosphor screen has the form of a rigid planar panel, or a flexible sheet able to assume a variety of shapes, or a rigid cylindrical tube, or a complex three dimensional shape. Similarly, in different embodiments, the luminescent portion has small or large crystals or even a single crystal; held in place by a layer of binder, or adhered in place, or held in place mechanically by fasteners or the like.

The phosphor of the invention is a crystalline material. The structure of crystalline materials on a "molecular level" can be categorized in a number of ways. Crystal structures can be categorized, in some cases, by analogy to various minerals. Oxides which crystallize in the undistorted, simple perovskite structure are usually represented by the formula $ABO_3$. The A atom is in the center of a cube and B atoms at each corner. Crystal structures can also be categorized by use of: (1) crystal system, (2) lattice type, and (3) point and space symmetry. The crystal system of a material is the basic geometry of the "unit cell": the smallest repeating unit which has the same symmetry as larger portions of the material. Crystalline materials are assigned to seven crystal systems: cubic, hexagonal, tetragonal, orthorhombic, monoclinic, trigonal, and triclinic; each of which is distinguished by the length and spatial relationships of the cell axes.

Bravais lattice types elaborate on the unit cell descriptions of crystal systems. Lattice types looks to the same array of lattice points as the crystal system, but also looks to positions in the center of the unit cell (body-centered), on the faces (face-centered), and at the vertices (primitive). As in crystal systems, the lattice points and other positions used in classification are geometric positions that may or may not coincide with the positions of atoms in the unit cell. There are 14 Bravais lattice types. Crystal system and Bravais lattice types can be used in combination to describe crystalline materials, with the exception that some combinations of crystal system and Bravais lattice type are redundant or geometrically incompatible.

Point and space symmetry refers to the use of symmetry elements to define a material. Symmetry elements are operations such as reflections and rotations that transform a structure to an orientation that is indecipherable from the original orientation. The combination of Bravais lattice type with point and space symmetry results in what is referred to as the "space group". There are 230 space groups which represent the combination of the 14 Bravais lattice types with the three dimensional symmetry elements. The structure of a crystal can be thought of as a draping of the ions or atoms of the compound within the geometry and symmetry indicated by the space group designation. The locations of the atoms or ions are given as fractional atomic coordinates within the unit cell parameters. The space group Pm3m has the following fractional atomic coordinates:

| |
|---|
| A atom = 0, 0, 0 |
| B atom = 0.5, 0.5, 0.5 |
| Oxygens = 0.5, 0.5, 0 |
| = 0.5, 0, 0.5 |
| = 0, 0.5, 0.5 |

The categorization of a particular crystalline material into a particular crystal system and space group is limited by the resolution of the diffractometer or camera used. Such materials are sometimes described in more exact terms as having a distortion from or substantial resemblance to the geometric model of a particular crystal system and space group. On the other hand, the phosphor of the invention can be referred to simply as having a cubic perovskite structure and Pm3m space group, since within the resolution limits of high resolution X-ray powder diffraction using $Cu_{\alpha 1}$ irradiation, the phosphor of the invention does not depart from the geometric model. (The high resolution X-ray powder diffraction technique utilized was Gunier-DeWolfe utilizing standard irradiation inclusive of $Cu_{\alpha 1}$ (wavelength=1.54051 Å).) Minute variances from the atomic positions indicated by cubic perovskite structure and Pm3m space group, could exist; but such differences are too small to be expressed as additional or split lines in the high resolution X-ray powder diffraction pattern. It is expected that other embodiments of the phosphor of the invention will also have this same cubic Perovskite structure and Pm3m space group, within the same resolution limits; however, even if such embodiments showed a deformation, those phosphors would still be classified as having a substantially cubic Perovskite structure and Pm3m space group.

The phosphor of the invention includes oxygen and a combination of species characterized by the relationship:

 (formula I)

The same designations appearing elsewhere herein have the same meanings unless specifically stated to the contrary. Grouped species, for example the species defined by M, are to be understood as inclusive of combinations of species in that group. M is thus Ca or Sr or a combination of the two.

Ca and Sr act much like "contaminants" in the phosphor of the invention, that is, Ca and Sr do not appear to provide an advantage when present; but, in relatively low concentrations, do not reduce the magnitude of luminescence. The concentration or mole fraction of M, the value of q, is from 0 to 0.15. Preferred ranges for Ca and Sr differ. This is discussed below in greater detail.

Limits on mole fractions expressed herein for the various atoms of the phosphor, do not represent useful ranges for the preparation of crystalline materials, nor even useful ranges for the preparation of materials which are capable of exhibiting luminescence under laboratory conditions. The limits expressed herein instead represent ranges for the preparation of phosphors that exhibit sufficient prompt luminescence, to be useful in practical phosphor screens, such as intensifying screens and scintillators. Many materials exhibit luminescence that is measurable, but is at to low a level for use in practical articles or is present only at very low temperatures.

Formula I can be rewritten substituting in Ca and Sr:

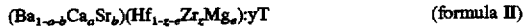

(formula II)

In formulas I and II, the mole fractions of Ca and Sr are subtracted from the mole fraction of Ba. On the other hand, the mole fraction of the other alkaline earth metal in the formulas, Mg, is subtracted from the mole fraction of hafnium. This is believed to be an accurate representation of the phosphor. It has been determined with reasonable certainty that calcium and strontium substitute into the crystal lattice at barium sites, whereas magnesium substitutes at hafnium sites. This effect is believed to be predominantly a question of the size of the Mg ion. (Hafnium sites are also shared by zirconium. Hf and Zr are very similar in size and it is well known that Zr substitutes into Hf lattice sites in many materials.) The claimed invention is not limited by explanations or theories presented herein. Thus, for example, in what is considered the unlikely event that the above explanation is incorrect and Mg substitutes into the Ba site rather than the Hf—Zr site; the above formulas although cumbersome are still valid, and the scope of the claims is unchanged.

The value of e, the mole fraction of Mg, is from 0 to 0.10. A preferred range for e is from 0 to 0.05. The value of z, the mole fraction of Zr, is from 0 to 1 or more preferably from 0 to 0.75. It is preferred, from the viewpoint of economical starting materials, to have z in the range of from $1 \times 10^{-5}$ to 1.

It is currently preferred that the phosphor of the invention be prepared from precursors fired in the presence of a particular flux or addenda. The flux has precursors containing an alkali metal or mixture of alkali metals or a percursor containing germanium or percursors for both alkali metal or metals and germanium. The flux reduces the temperature at which precursor materials must be fired to prepare the phosphor of the invention by as much as 1000° C. This is important practical advantage.

The phosphor produced using such flux retains a portion of alkali metal or metals and/or germanium from the flux. It is hypothesized that the alkali metal or metals and/or germanium act as inert components in the phosphor. As previously noted, the scope of the claimed invention is not limited by any such explanation or theory presented herein. Taking into account the flux materials, formula II can be rewritten:

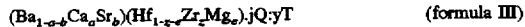

(formula III)

Q is one or more alkali metals or germanium or the combination of one or more alkali metals and germanium. The value of j is from $1 \times 10^{-6}$ to 0.05.

It is preferred that the alkali metal is lithium and it is more preferred that Q is a combination of Li and Ge. Formula III can be rewritten to include Li and Ge:

(formula IV)

The value of w, is from 0 to 0.05, preferably from $1 \times 10^{-6}$ to 0.05, and more preferably from $1 \times 10^{-6}$ to 0.025. The value of x is from 0 to $1.5 \times 10^{-3}$, or preferably from $1 \times 10^{-6}$ to $1 \times 10^{-3}$, and more preferably from $1 \times 10^{-4}$ to $7 \times 10^{-4}$.

In formulas I–IV, T represents one or more of the activators: Cu, Eu, Dy, Sm, Ho, Er, and Tm. The Examples demonstrate activation provided by these species. The value of y, the mole fraction of activator, is from $1 \times 10^{-6}$ to 0.02. A preferred range for y is from $2 \times 10^{-4}$ to 0.02. Preferred activators are Cu, Dy, Sm, Ho, and Er and combinations thereof. More preferred activators are Dy, Sm, Ho, and Er and combinations thereof. In contrast, Comparative Examples 60–63 demonstrate that some other lanthanides provide little or no activation.

Referring now to FIG. 1, the phosphor screen 10 of the invention, in particular embodiments, is a radiographic phosphor screen (sometimes also referred to as a radiographic panel) having a support 12 and a luminescent layer 14 overlaying the support 12. An overcoat layer 16, although not required, is commonly located over the luminescent layer 14 for humidity and wear protection.

The luminescent layer includes the composite phosphor in the form of a polycrystalline mass. Typically, a mass of individual particles are distributed in a binder, which gives the mass structural coherence and retains the mass on the support. The size and shape of the phosphor particles are determined, in the same manner as other phosphors, by requirements of a particular use and factors such as manufacturing constraints. Convenient parameters for a phosphor particulate useful in radiographic screens are a median particle size of from 1 to 40 micrometers.

Useful binders are those conventionally employed in the art. Binders are generally chosen from a wide variety of known organic polymers which are transparent to x-rays, stimulating light (for storage screens), and emitted light. Binders commonly employed in the art include sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); and poly(urethane) elastomers. These and other useful binders are disclosed in U.S. Pat. Nos. 2,502,529; 2,887,379; 3,617,285; 3,300,310; 3,300,311; and 3,743,833; and in *Research Disclosure*, Vol. 154, February 1977, Item 15444, and Vol. 182, June 1979. *Research Disclosure* is published by Kenneth Mason Publications, Ltd., Emsworth, Hampshire P010 7DD, England. Particularly preferred binders are poly(urethanes), such as those commercially available under the trademark Estane from Goodrich Chemical Co., the trademark Permuthane from the Permuthane Division of ICI, and the trademark Cargill from Cargill, Inc.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for screen constructions intended to withstand commercial exposure repetitions without loss of structural integrity. For limited or single exposure applications, any minimal amount of binder consistent with structural integrity is satisfactory.

For the highest attainable speeds a white support, such as a titania or barium sulfate loaded or coated support can be employed. Particular reflective supports which offer a balance of speed and sharpness are those containing reflective microlenslets, such as are disclosed in U.S. Pat. No. 4,912,333 to Roberts, et al. In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. It is specifically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. With storage screens, it is preferable to include a dye or pigment which absorbs some of the stimulating radiation, generally provided by a laser; but mostly reflects emitted light. U.S. Pat. No. 4,491,736, to Teraoka, teaches the use of such materials in storage screens.

Apart from the phosphor layers and the assembly features described above, the screen can be of any conventional construction. Screens typically have one or more flexible or rigid support layers. Flexible layers are most commonly polymeric. The most common polymeric supports are films of high dimensional integrity, such as poly(ethylene terephthalate) film supports. In a nonflexible screen, support is provided by one or more polymeric layers and by a rigid plate of aluminum or the like.

Metal layers, such as aluminum, enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by *Research Disclosure*, Vol. 176, December 1978, Item 17643, Section XVII, and *Research Disclosure*, Vol. 184, August 1979, Item 18431, Section I.

The overcoat layer comprises a binder chosen using the criteria described above for the binder in the luminescent layer. The overcoat binder can be the same binder as in the luminescent layer or different and can also be chosen from polymers useful for supports. Polymers conventionally employed for film supports can be used in the overcoat layer. For example, cellulose acetate is an overcoat commonly used with the poly(urethane) binders. Overcoat polymers are often also used to seal the edges of the phosphor layer. A suitable overcoat is disclosed in U.S. Pat. No. 5,401,971.

While anticurl layers are not required for the screens, they are generally preferred for inclusion. The function of the anticurl layer is to balance the forces exerted by the layers coated on the opposite major surface of a support which, if left unchecked, could cause the support to assume a nonplanar configuration, that is, to curl or roll up on itself. Materials forming the anticurl layers can be chosen from among those identified above for use as binders and overcoats. Generally an anticurl layer is formed of the same polymer as the overcoat on the opposite side of the support.

Any one or combination of conventional screen features compatible with the features described herein can, of course, be employed. Conventional storage screen constructions are disclosed in U.S. Pat. No. 4,380,702 to Takahashi et al., the disclosure of which is hereby incorporated by reference. Conventional intensifying screen constructions are disclosed in *Research Disclosure*, Vol. 184, August 1979, Item 18431, hereby incorporated herein by reference.

The radiographic screens are formed by conventional coating techniques. Phosphor powder and addenda are mixed with a solution of a resin binder material and coated by means such as blade coating onto a substrate. U.S. Pat. No. 4,505,989, to Umemoto et al., the disclosure of which is hereby incorporated herein by reference, describes suitable techniques known in the art for preparing a radiographic screen..

The phosphor screen of the invention, in some embodiments, is what can be referred to as a "large crystal device". In contrast to a radiographic screen, the mass of small phosphor particles is replaced by a relatively small number of large crystals or even a single very large crystal. The support and binder are replaced by a mechanical structure that holds the crystal or crystals in a desired orientation. The large crystal device can also include a light responsive element, such as an array of photodiodes. The crystals are arranged so that the longest dimension of each crystal is aligned with the direction of incident radiation. This maximizes the thickness, and thus the radiation stopping power, of the phosphor "layer". The crystals together define a surface that faces the direction or directions from which incident radiation is to be received. In many applications, such as computed tomography, it is desirable to capture only radiation incident from a single direction, the direction of the collimated beam used to image the subject matter. In these applications, the crystals define a plane. In some other applications, such as high energy physics detectors, it is desirable to capture radiation emitted in many directions from a particular location and the crystals therefore define a complex curved surface centered upon the site of origin of events to be detected. These multidirectional detectors are otherwise substantially similar to the unidirectional detectors previously described.

Figure 2:
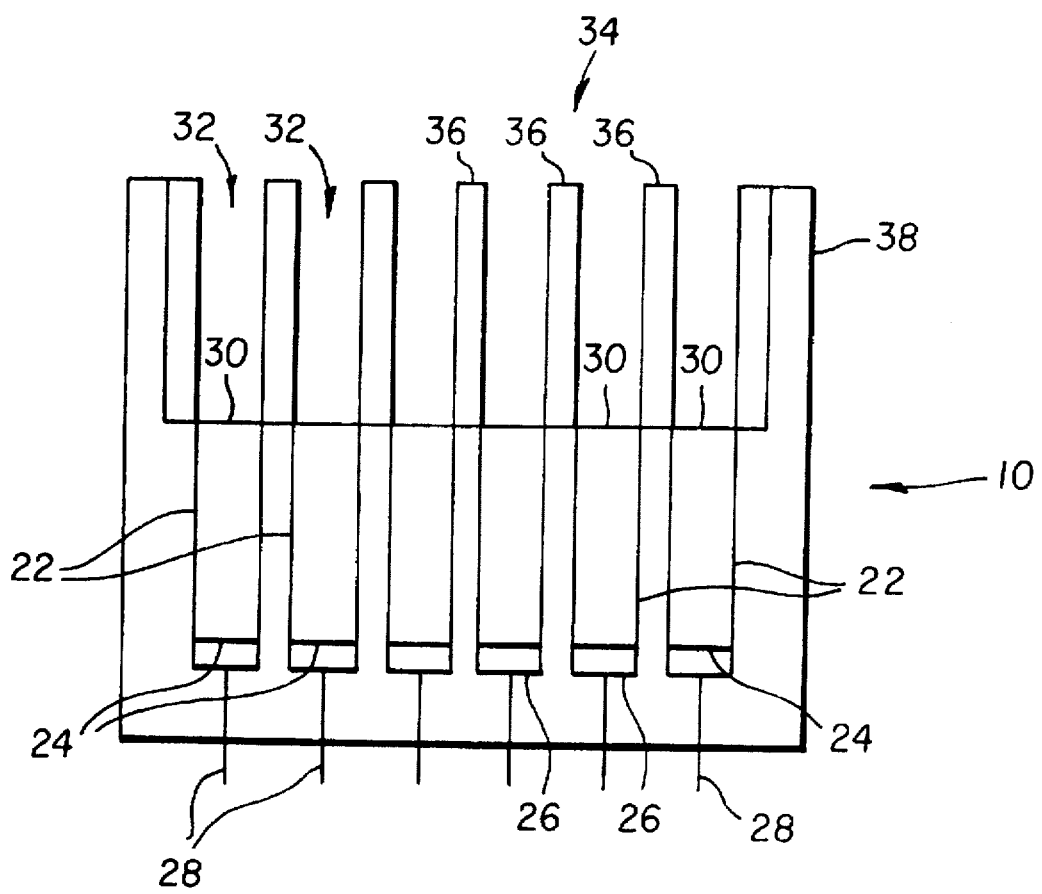
FIG. 2 is a partially schematic diagrammatical cross-section of another embodiment of the phosphor screen of the invention configured as a scintillator.

FIG. 2 is a partially schematic diagram of another configuration of the phosphor screen 10 of the invention: a unidirectional large crystal device. A series of large crystals 22 of the phosphor of the invention are arranged in parallel orientation, with respective crystal faces all aligned in the same directions. At the rear end face 24 of each crystal 22 is a photodetector 26 that is disposed to receive radiation emitted by the respective crystal 22 secondary to absorption of x-rays or other primary high energy radiation and transmit a signal through a signal line 28. The front end faces 30 are each substantially perpendicular to the detected radiation and each define a light path 32 extending outward from the respective front end face. Extending forward from the front end faces 30 of the crystals 22 is a collimator 34 of a material such as lead. The collimator has an array of collimator elements 36 bordering each light path 32 on two or more sides (only two sides are shown). The collimator elements 36 absorb incident radiation that is not substantially parallel to a respective crystal 22. The collimator can function as a support for the phosphor crystals and photodetectors; however, it is preferred that a separate support 38 hold the crystals 22, collimator 34, and photodetectors 26 in their relative orientations. The support 38 can take a variety of shapes and be made from a variety of materials. A primary consideration is ordinarily the ability of the support to maintain the various components in stable relative relation during use.

It is expected that relatively large crystals of the phosphor of the invention can be prepared by the following method. A physical mixture would be first prepared by mixing: from about 0.15 to about 0.45 mole fraction $BaCO_3$ or BaO; from about 0.25 to about 0.60 mole fraction $BaF_2$, from about 0.15 to about 0.40 mole fraction $B_2O_3$, and $MO_2$ (M is Hf or Zr or both) in the range of from about 0.5 to about 10 wt % relative to the total weight of reactants. Outside these ranges, the yield of crystals is expected to be low, or non-existent. Higher concentrations of $BaF_2$ would be expected to corrode the platinum crucible, making preparation impractical. Higher concentrations of $B_2O_3$ would be expected to cause the formation of large crystals of BaM $(BO_3)_2$, where M is Zr, Hf, or both. It is expected that in a preferred embodiment of the invention, the physical mixture would also include $GeO_2$ at about the same concentration as the $MO_2$ to improve the size and quality of phosphor crystals produced. The physical mixture would be heated to a temperature of from about 1150° C. to about 1550° C. for from 2 to about 22 hours. The resulting product would then be cooled at a rate of from about 0.1° C./hr to about 25° C./hr. Slower cooling is expected to yield larger crystals of higher optical purity. Larger crystals would also be expected with the use of accelerated crucible rotation as described in Scheel, J. Crystal Growth, Vol. 8, pages 304–306 (1971). A perferred rotation program is 0-60-0 rpm acceleration/ decceleration over a period of 60 sec.

The following Examples and Comparative Examples are presented to further illustrate and elucidate some preferred modes of practice of the invention. Unless otherwise indicated, all starting materials were commercially obtained.

The relative luminescence response of the phosphor powder was measured by packing the phosphor powder into aluminum planchettes (2 mm high×24 mm diameter) at a coverage of about 1 g/cm² and exposing the sample to filtered X-radiation. The X-ray source was a tungsten target tube in a XRD 6 generator operating at 70 kVp and 10 mA. The filtration consisted of 0.5 mm copper and 1.0 mm aluminum. The luminescence response was measured at a temperature of approximately 300° K, using an IP-28 photomultiplier tube at 500 V bias. The voltage from the photomultiplier was measured with a Keithley high impedance electrometer and is proportional to the total light output of the sample.

Emission spectra were obtained with an instrument consisting of an Instruments S. A. Model HR 320 grating spectrometer coupled with a Princeton Applied Research Model 1421 intensified linear diode array detector. The data acquisition and processing was controlled by a Princeton Research Model 1460 OMA III optical multichannel analyzer. Spectra were corrected for the spectral response of the detector-spectrograph combination. Samples were placed in planchettes as described above and irradiated with X-rays from a tungsten target tube operated at 70 kVp and 10 mA. Spectra were repeated with and without the filtration described above. Colors of the emissions, reported herein, are based upon the perception of the experimenter without additional colorimetric analysis.

The stoichiometry given in the table headings is nominal and is only meant to indicate intentional substitution. No conclusions regarding lattice vacancies/interstitials or oxygen content are implied.

COMPARATIVE EXAMPLE 1

$BaHfO_3$

The phosphor was prepared by the combination of one mole of $HfO_2$ (0.26 mole % $Zr^{4+}$) and 0.5 mole portions of $BaCO_3$ (99.99%) and $BaF_2$ (99.9% or better purity) in an agate mortar with acetone as a grinding aid. The ground powder was placed in an alumina crucible and fired in air for 8 hours in a box furnace at 1100° C. Following recovery and regrinding of the charge it was refired in the same furnace at 1280° C. for eight hours. The X-ray powder diffraction pattern of the charge showed the cubic perovskite $BaHfO_3$ as the major phase, with a small amount of hafnia as impurity.

The sample showed an emission spectrum dominated by an ultraviolet peak centered at approximately 315 nm, and a very weak peak centered at 410 nm which was attributed to titanium impurities. The relative prompt emission response of this material was set to equal 100. Values for prompt emission in other examples and comparative examples are relative to that value.

COMPARATIVE EXAMPLE 2

$BaHfO_3$

Preparation of $BaHf(C_2O_4)_3 \cdot nH_2O$: Solution A was prepared from 61.428 g (0.15 mole) of $HfOCl_2 \cdot 8H_2O$ (RGS, 0.26 mol % Zr) in 500 ml MeOH (anhydrous reagent grade). Solution B was prepared from 52.478 g (0.1575 mole) $BaBr_2 \cdot 2H_2O$ (reagent grade) in 400 ml of methanol. Solution C was prepared from 198.545 g (0.1575 mole) of $H_2C_2O_4 \cdot 2H_2O$ (reagent grade) in 500 ml of methanol. Solution B was poured into solution A followed by vacuum filtration. Solution C was then added slowly (30 minutes) to the combined A+B solution with stirring. The precipitate was aged at 60° C. for 1 hr. The material was collected by vacuum filtration and air-dried for two days. The dried material was washed twice with 600 ml of methanol and air-dried.

For the preparation of the undoped compound of Comparative Example 2, the precursor described above was decomposed in air in a box furnace at 1250° C. The X-ray powder diffraction pattern of the final product showed only the cubic $BaHfO_3$ pattern. A 3.636 g (0.01 mole) portion of this fired material was mixed with following flux components: 0.275 g (0.0025 mole) $Li_2SO_4$ (99.7%), 0.0259 g (0.001 mole) LiF (99.9% or better purity), 0.0523 g (0.0005 mole) $GeO_2$ (99.999%), in an agate mortar and pestle. Acetone was used as a grinding aid. The resulting mixture was placed in an alumina crucible and covered with an alumina lid and placed in the center zone of a 3 inch diameter alumina tube in a horizontal tube furnace. A high purity $CO_2$ atmosphere (1.5 liter/min) was used throughout the process. After purging, the sample was heated to 1300° C. in 3 hours, held for 6 hours and then cooled over 6 hours to room temperature. The relative prompt emission response is indicated in Table 1.

EXAMPLES 3–9

$BaHfO_3:Dy^{3+}$

Examples 3–9 were prepared in substantially the same manner and concurrently with Comparative Example 2, with the exception that, for each of Examples 3–9, an appropriate aliquot of a 0.1M or 1.0M $Dy(NO_3)_3$ (99.9% or better purity) aqueous solution was added to a 3.636 g of the $BaHfO_3$ source and the flux mixture described above. The materials were ground in an agate mortar and pestle with acetone. The dried materials were then processed under $CO_2$ as described above. The X-ray powder diffraction pattern of the final materials showed $BaHfO_3$ as the major phase. The x-ray excited spectrum was obtained for Example 5 and is reported in Table 7. The $Dy^{3+}$ emission spectrum showed three intense peaks at approximately 480, 580 and 670 nm. The relative prompt emission responses of Examples 3–9 are shown in Table 1.

TABLE 1

$BaHfO_{3-y}Dy^{3+}$

| Example or Comparative Example | Value of y | Relative response |
|---|---|---|
| Comparative Example 2 | 0.0 | 77 |
| Example 3 | 0.0001 | 900 |
| Example 4 | 0.0002 | 917 |
| Example 5 | 0.0005 | 1007 |
| Example 6 | 0.001 | 904 |
| Example 7 | 0.005 | 921 |
| Example 8 | 0.01 | 850 |
| Example 9 | 0.02 | 527 |

EXAMPLE 10

$BaHfO_3:0.0005Dy^{3+}$

A $BaHfO_3$ source was prepared from the combination of $HfO_2$ (RGS; 0.249 mol % Zr) and $BaCO_3$ (99.99%) in an agate mortar and pestle with acetone as a grinding aid. The ground mixture was fired to 1250° C. as described above. The charge was then reground with an aliquot of 0.1M $Dy(NO_3)_3$ aqueous solution (0.05 mole %), 100 mole % $Li_2SO_4$ (99.7%), 18.75 mole % $GeO_2$ (99.999%), and 10 mole % $Li_2CO_3$ (99.997%) in acetone. The air-dried sample was then heated at 1300° C. in 1.5 liters/m $CO_2$. The relative response of the phosphor was 1487. The relative response of a commercial $Gd_2O_2S:Tb^{3+}$ screen (Lanex Regular™ marketed by Eastman Kodak Company of Rochester, N.Y.) under identical conditions is 4197. (The sensitivity of the IP-28 photomultiplier used for the major $Dy^{3+}$ emission peaks was significantly lower than for the major 545 nm emission in the Lanex Regular screen.)

EXAMPLE 11

$BaHfO_3:0.0005Sm^{3+}$

A $BaHfO_3$ source was prepared from the combination of $HfO_2$ (RGS; 0.249 mol % Zr) and $BaCO_3$ (99.99%) in an agate mortar and pestle with acetone as a grinding aid. The ground mixture was fired to 1250° C. as described above. The charge was then reground with an aliquot of 0.1M $Sm(NO_3)_3$ aqueous solution (0.05 mole %), 100 mole % $Li_2SO_4$ (99.7%), 3.0 mole % $GeO_2$ (99.999%), and 10 mole % $Li_2CO_3$ (99.997%) in acetone. The air-dried sample was then heated at 1300° C. in 1.5 liters/min $CO_2$. The emission spectrum was obtained and is reported in Table 7. The emission spectrum exhibited peaks at 565, 600, 650, and 700. The relative response of the phosphor was 206. (The sensitivity of the IP-28 photo-multiplier was not linear throughout the visible region, and was particularly weak in the red region of the spectrum where the $Sm^{3+}$ emissions lie.)

EXAMPLES 12–24

$BaHf_{1-z}Zr_zO_3:0.0015Sm^{3+}$

A $BaHf_{1-z}Zr_zO_3$ source was prepared by grinding the appropriate amounts of either $HfO_2$ (optical grade; 0.0087 mole % Zr or RGS; 0.249 mol % Zr) or $ZrO_2$ (RGS: 0.004 mole % Hf) with $BaCO_3$ (99.99%) in an agate mortar and pestle with acetone. After firing to 1250° C., the sources were ground with the flux mixture described in Comparative Example 2 and an aliquot of 0.1M $Sm(NO_3)_3$ aqueous solution, and fired to 1300° C. in $CO_2$ as described above. The relative responses are shown below in Table 2.

The examples show efficient activation of the $BaHfO_3$ host by $Sm^{3+}$ from optical grade levels of $Zr^{4+}$ incorporation to complete substitution ($BaZrO_3$). A comparison of the integrated intensity from 515–700 nm in the emission spectra (50 kVp, filtered) showed that the phosphor of Example 16 gives approximately 82 percent the light output of a commercial Lanex Regular screen, marketed by Eastman Kodak Company of Rochester, N.Y.

TABLE 2

$BaHf_{1-z}Zr_zO_3:0.0015Sm^{3+}$

| Example | Value of z | Relative response |
|---|---|---|
| 12 | 0.000087 | 294 |
| 13 | 0.0002 | 280 |
| 14 | 0.001 | 320 |
| 15 | 0.00249 | 330 |
| 16 | 0.005 | 298 |
| 17 | 0.01 | 300 |
| 18 | 0.025 | 328 |
| 19 | 0.05 | 320 |
| 20 | 0.10 | 342 |
| 21 | 0.25 | 310 |
| 22 | 0.50 | 274 |
| 23 | 0.75 | 226 |
| 24 | 1.00 | 172 |

EXAMPLE 25

$BaHfO_3:0.0005Ho^{3+}$

The sample was prepared in substantially the same manner as in Example 10, with the exception that a 0.1M $Ho(NO_3)_3$ (99.9% or better purity) solution was used. The emission spectrum was obtained and is reported in Table 7. The relative response of the phosphor was 1045.

EXAMPLES 26–36

$Ba_{1-b}Sr_bHfO_3:0.001Ho^{3+}$

Samples were prepared from $HfO_2$ (RGS, 0.249 mole % Zr), $BaCO_3$ (99.99%), and $SrCO_3$ (99.999%). The powders were ground and fired as above at 1250° C. The fired charges were then ground with an aliquot of a 0.1M $Ho(NO_3)_3$ aqueous solution (99.9% or better purity) followed by the 1300° C. firing under $CO_2$ with the $Li_2SO_4/LiF/GeO_2$ flux mixture described in Comparative Example 2. The relative responses are shown below in Table 3:

TABLE 3

$Ba_{1-b}Sr_bHfO_3:0.001Ho^{3+}$

| Example | Value of b | Relative response |
|---|---|---|
| 26 | 0 | 1157 |
| 27 | 0 | 1357 |
| 28 | 0.0005 | 1181 |
| 29 | 0.0025 | 1135 |
| 30 | 0.01 | 1117 |
| 31 | 0.025 | 1129 |
| 32 | 0.05 | 1393 |

TABLE 3-continued $Ba_{1-b}Sr_bHfO_3:0.001Ho^{3+}$

| Example | Value of b | Relative response |
|---|---|---|
| 33 | 0.05 | 1357 |
| 34 | 0.075 | 1059 |
| 35 | 0.10 | 1153 |
| 36 | 0.15 | 1224 |

EXAMPLES 37–42

$Ba_{1-a}Ca_aHfO_3:0.001Ho^{3+}$

Samples were prepared as in Examples 26–36, with the substitution of $CaCO_3$ (phosphor grade) for $SrCO_3$. The relative responses are shown below in Table 4.

TABLE 4

$Ba_{1-a}Ca_aHfO_3:0.001Ho^{3+}$

| Example | Value of a | Relative response |
|---|---|---|
| 37 | 0 | 1215 |
| 38 | 0.0005 | 1242 |
| 39 | 0.0025 | 1231 |
| 40 | 0.01 | 1175 |
| 41 | 0.025 | 1276 |
| 42 | 0.05 | 1034 |

EXAMPLES 43–48

$BaHf_{1-e}Mg_eO_3:0.001Ho^{3+}$

Samples were prepared as above in Examples 26–36 with $Mg(CH_3CO_2)_2$ (reagent) used instead of $SrCO_3$ and substitution at $Hf^{4+}$ rather than $Ba^{2+}$. The relative responses are shown below in Table 5.

TABLE 5

$BaHf_{1-e}Mg_eO_3:0.001Ho^{3+}$

| Example | Value of e | Relative response |
|---|---|---|
| 43 | 0 | 1478 |
| 44 | 0.0005 | 1198 |
| 45 | 0.0025 | 1058 |
| 46 | 0.01 | 1025 |
| 47 | 0.025 | 1207 |
| 48 | 0.05 | 1458 |

EXAMPLE 49

Intensifying Screen Comprised of $BaHfO_3:0.001Ho^{3+}$

A 50 g charge were prepared from an equimolar mixture of $HfO_2$ (RGS, 0.249 mole % Zr) and $BaCO_3$ (99.99%). The powders were ground together with acetone in an agate mortar. The dried charge was fired in air in a box furnace at 1250° C. The x-ray powder diffraction of this material showed only the $BaHfO_3$ perovskite pattern. The fired charge was then ground with 1.35 ml of 0.1M $Ho(NO_3)_3$ aqueous solution and 100 mole % $Li_2SO_4$ (99.7%), 18.75 mole % $GeO_2$ (99.999%), and 10 mole % $Li_2CO_3$ (99.997%) in acetone. The dried mixture was then fired for 6 hours at 1300° C. in a 1.5 liter/min $CO_2$ flow. The cooled ingot was washed four times with 500 ml of hot distilled water and then collected by vacuum filtration. The dried powder was sieved through a 45 micrometer metal sieve. The relative response of the material was 1778.

35 grams of the above powder were added to 12.82 grams of a 13% Permuthane™ solution in a methylene chloride and methanol mixture to produce a dispersion with 21 parts of phosphor to 1 part of binder by weight. The mixture was blended for 20 minutes at 2000 rpm with a Dispermat. The dispersion was coated on white ESTAR™ at 93 g/ft². The relative response of the coating was 1497. A comparison of the integrated intensity from 515–585 nm in the emission spectra (50 kVp, filtered) shows that the screen gives approximately 79 percent the light output of a commercial Lanex Regular screen.

EXAMPLE 50

$BaHfO_3:0.0005Er^{3+}$

The sample was prepared in substantially the same manner as Example 10, with the exception that a 0.1M $Er(NO_3)_3$ (99.9% or better purity) solution was used. The x-ray excited spectrum is reported in Table 7. The relative response of the phosphor was 907.

EXAMPLE 51

$BaHfO_3:0.0005Tm^{3+}$

The sample charge was prepared as in was Example 10, with the exceptions that a 0.05M $Tm(NO_3)_3$ (99.9% or better purity) solution was used, and the flux mixture was composed of 100 mole % $Li_2SO_4$ (99.7%) and 10% $Li_2CO_3$ (99.997%). The x-ray excited spectrum is reported in Table 7. The relative response of the phosphor was 263.

EXAMPLE 52

$BaHfO_3:0.0005Eu^{3+}$

The sample was prepared by grinding with acetone the following powders: HfO2 (RGS, 0.0249 mole % $Zr^{4+}$), $BaCO_3$ (99.99%), $EuCO_3$, 100 mole % $Li_2SO_4$ (99.7%) and 10 mole % $Li_2CO_3$ (99.997%). The sample was then heated to 1300° C. for 6 hours under 1.5 liter/min $CO_2$. The recovered sample showed red luminescence which indicated the presence of $Eu^{3+}$. The emission spectrum was obtained and is reported in Table 7. The relative response of the sample was 42.

EXAMPLE 53

$BaHfO_3:0.0005Eu^{2+}$

The sample from Example 52 was refired at 850° C. for 6 hours in 4% $H_2$ argon atmosphere flowing at 1.5 liter/min. The emission spectrum was obtained and is reported in Table 7. The spectrum of the sample showed a broad green emission centered at approximately 460 nm, in addition to a spike approximately 600 nm from residual $Eu^{3+}$. The recovered phosphor gave a relative response of 298.

COMPARATIVE EXAMPLE 54

$BaHfO_3$

An undoped $BaHfO_3$ source was prepared at 1250° C. as in Example 10. The relative response is reported in Table 6.

EXAMPLES 55–57

$BaHfO_3:0.001Cu$

Portions of the undoped $BaHfO_3$ source prepared in Comparative Example 54 were ground with appropriate amounts of CuBr (reagent) and 10 mole % $Li_2SO_4$ (99.7%) and 10 mole % LiF ((99.9% or better purity)). The dried powders was fired at 1350° C. in $CO_2$ as described above. The copper-doped compositions exhibited green luminescence. It is believed that the emitting species is $Cu^+$. The relative responses are shown below in Table 6 and the emission data for Example 55 in Table 7.

TABLE 6

$BaHfO_{3-y}Cu^+$

| Example or Comparative Example | Value of y | Relative response |
|---|---|---|
| Comparative Example 54 | 0 | 40 |
| Example 55 | 0.0005 | 466 |
| Example 56 | 0.0015 | 518 |
| Example 57 | 0.0045 | 324 |

EXAMPLE 58

$BaHfO_3$:0.0005Dy.0.001Ho

The sample was prepared in substantially the same manner as in Examples 3–8. $HfO_2$ (RGS, 0.249 mole % Zr) and $BaCO_3$ (99.99%), and $Ce(NO_3)_3.6H_2O$ (99.9% or better purity) were admixed. The undoped precursor mixture was fired as above at 1250° C., and then ground with an aliquot of 0.1M $Ho(NO_3)_3$ (99.9% or better purity), 0.1M $Dy(NO_3)_3$ (99.9% or better purity), and the $Li_2SO_4$/LiF/$GeO_2$ flux mixture. The mixture was fired at 1300° C. under $CO_2$. After washing, the relative response was 1117.

EXAMPLE 59

$BaHfO_3$:0.002Sm.0.003Ho

The sample was prepared in substantially the same manner as in Example 58, by the combination of $HfO_2$ (RGS, 0.249 mole % Zr), $BaCO_3$ (99.99%), $Ho(NO_3)_3.6H_2O$ (99.9% or better purity), $Sm(NO_3)_3.6H_2O$ (99.9% or better purity) and the $Li_2SO_4$/LiF/$GeO_2$ flux mixture. The ground mixture was fired at 1300° C. under $CO_2$. After washing, the relative response was 578.

COMPARATIVE EXAMPLE 60

$BaHfO_3$:0.0005Pr

The sample was prepared in substantially the same manner as in Example 10 with the exception that $Pr(NO_3)_3$ (99.9% or better purity), was used in place of $Dy(NO_3)_3$ and $GeO_2$ was not added. The relative response of the sample was 32.

COMPARATIVE EXAMPLE 61

$BaHfO_3$:0.0005Tb

The sample was prepared in substantially the same manner as in Comparative Example 60, except $Tb(NO_3)_3$ (99.9% or better purity) was used in place of $Pr(NO_3)_3$. The relative response of the sample was 44.

COMPARATIVE EXAMPLE 62

$BaHfO_3$:0.0005Gd

The sample was prepared in substantially the same manner as in Comparative Example 60, except $Gd(NO_3)_3$ (99.9% or better purity) was used in place of $Pr(NO_3)_3$. The relative response of the sample was 78. More than 90 percent of the luminescence intensity was explainable as being due to an impurity level $Ti^{4+}$ emission.

COMPARATIVE EXAMPLE 63

$BaHfO_3$:0.0005Nd

The sample was prepared in substantially the same manner as in Comparative Example 60, except $Nd(NO_3)_3$ (99.9% or better purity) was used in place of $Pr(NO_3)_3$ and 50 mole percent rather than 100 mole percent $Li_2SO_4$ was used. The relative response of the sample was too weak to measure.

Results comparing the different activators in the same host are collected in Table 7. The relative responses listed are at the same activator concentration, however, this concentration is not optimal for all the listed phosphors. The phosphors of the invention provide surprisingly good prompt emissions that are surprisingly different from the comparable europium activated phosphors.

TABLE 7

$BaHfO_3$.0.0005T

| Example | Activator | Peak emission-color | Relative response |
|---|---|---|---|
| Example 5 | $Dy^{3+}$ | 480, 580, 670-yellow | 1007 |
| Example 11 | $Sm^{3+}$ | 565, 600, 650, 700-reddish-orange | 206 |
| Example 25 | $Ho^{3+}$ | 550 (broad)-yellowish green | 1045 |
| Example 50 | $Er^{3+}$ | 530, 555 (doublet)-yellowish-green | 907 |
| Example 51 | $Tm^{3+}$ | 365, 450–500 (doublet), 655-green | 263 |
| Example 52 | $Eu^{3+}$ | 600-red | 42 |
| Example 53 | $Eu^{2+}$ | 460 (broad)-blue-green | 298 |
| Example 55 | Cu | 550 (broad)-green | 466 |

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A radiographic phosphor screen comprising a support and, coated on the support, at least one layer forming a luminescent portion and an overcoat layer, said luminescent portion and overcoat layer including a binder that is transparent to X-radiation and emitted light and said luminescent portion including phosphor particles in a weight ratio of phosphor particles to binder of 7:1 to 25:1, said phosphor comprising oxygen and a combination of species characterized by the relationship:

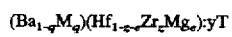

wherein

M is selected from the group consisting of Ca and Sr and combinations thereof;

T is Cu;

q is from 0 to 0.15;

z is from 0 to 1;

e is from 0 to 0.10;

z+e is from 0 to 1;

y is from $1\times10^{-6}$ to 0.02.

2. The phosphor radiographic screen of claim 1 wherein y is from $2\times10^{-4}$ to 0.02.

3. The phosphor radiographic screen of claim 1 wherein said phosphor is x-ray luminescent at a temperature of 300° K.

4. The phosphor radiographic screen of claim 1 wherein said phosphor comprises oxygen and a combination of species characterized by the relationship:

$(Ba_{1-a-b}Ca_aSr_b)(Hf_{1-z-e}Zr_zMg_e):yT$ wherein

T is Cu;

a is from 0 to 0.05;

b is from 0 to 0.15;

a+b is from 0 to 0.15;

z is from $1\times10^{-5}$ to 1;

e is from 0 to 0.05;

z+e is from $1\times10^{-5}$ to 1;

y is from $1\times10^{-6}$ to 0.02.

5. The phosphor radiographic screen of claim 4 wherein z is from 0 to 0.75.

6. The radiographic phosphor screen of claim 1 wherein said phosphor consists essentially of oxygen and a combination of species characterized by the relationship:

$(Ba_{1-a-b}Ca_aSr_b)(Hf_{1-z-e}Zr_zMg_e).wLi.xGe:yT$ wherein

T is Cu;

a is from 0 to 0.05;

b is from 0 to 0.15;

a+b is from 0 to 0.15;

z is from $1\times10^{-5}$ to 1;

e is from 0 to 0.05;

z+e is from $1\times10^{-5}$ to 1;

w is from 0 to 0.05;

x is from 0 to $1.5\times10^{-3}$;

w+x is from $1\times10^{-6}$ to 0.05; and y is from $1\times10^{-6}$ to 0.02.

7. The phosphor radiographic screen of claim 6 wherein w is from $1\times10^{-6}$ to 0.05.

8. The radiographic phosphor screen of claim 6 wherein w is from $1\times10^{-6}$ to 0.025.

9. The radiographic phosphor screen of claim 6 wherein x is from $1\times10^{-4}$ to $7\times10^{-4}$.

10. The radiographic phosphor screen of claim 1 wherein said phosphor is crystallized as the cubic Perovskite structure (Pm3m space group) as determined by X-ray powder diffraction using $Cu_{\alpha1}$ irradiation.

11. The radiographic phosphor screen of claim 1 further characterized as a radiographic intensifying screen.

12. A phosphor comprising oxygen and a combination of species characterized by the relationship:

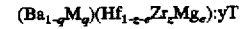

$(Ba_{1-q}M_q)(Hf_{1-z-e}Zr_zMg_e):yT$ wherein

M is selected from the group consisting of Ca and Sr and combinations thereof;

T is Cu;

q is from 0 to 0.15;

z is from 0 to 1;

e is from 0 to 0.10;

z+e is from 0 to 1;

y is from $1\times10^{-6}$ to 0.02.

13. The phosphor of claim 12 wherein y is from $2\times10^{-4}$ to 0.02.

14. The phosphor of claim 12 wherein said phosphor comprises oxygen and a combination of species characterized by the relationship:

$(Ba_{1-a-b}Ca_aSr_b)(Hf_{1-z-e}Zr_zMg_e):yT$ wherein

T is Cu;

a is from 0 to 0.05;

b is from 0 to 0.15;

a+b is from 0 to 0.15;

z is from $1\times10^{-5}$ to 1;

e is from 0 to 0.05;

z+e is from $1\times10^{-5}$ to 1;

y is from $1\times10^{-6}$ to 0.02.

15. The phosphor of claim 14 wherein z is from $2\times10^{-4}$ to 1.

16. The phosphor of claim 14 wherein z is from $2\times10^{-4}$ to 0.75.

17. The phosphor of claim 12 wherein said phosphor is crystallized as the cubic Perovskite structure (Pm3m space group) as determined by X-ray powder diffraction using $Cu_{\alpha1}$ irradiation.

18. A phosphor comprising oxygen and a combination of species characterized by the relationship:

$(Ba_{1-a-b}Ca_aSr_b)(Hf_{1-z-e}Zr_zMg_e).wQ:yT$ wherein

Q is at least one of Li and K;

T is Cu;

a is from 0 to 0.05;

b is from 0 to 0.15;

a+b is from 0 to 0.15;

z is from $1\times10^{-5}$ to 1;

e is from 0 to 0.05;

z+e is from $1\times10^{-5}$ to 1;

w is from $1\times10^{-6}$ to $5\times10^{-2}$; and y is from $1\times10^{-6}$ to 0.02.

19. A phosphor consisting essentially of oxygen and a combination of species characterized by the relationship:

$(Ba_{1-a-b}Ca_aSr_b)(Hf_{1-z-e}Zr_zMg_e).wLi.xGe:yT$ wherein

T is Cu;

a is from 0 to 0.05;

b is from 0 to 0.15;

a+b is from 0 to 0.15;

z is from $1\times10^{-5}$ to 1;
e is from 0 to 0.05;
z+e is from $1\times10^{-5}$ to 1;
w is from 0 to 0.05;
x is from 0 to $1.5\times10^{-3}$;
w+x is from $1\times10^{-6}$ to 0.05; and
y is from $1\times10^{-6}$ to 0.02.

20. The phosphor of claim 19 wherein w is from $1\times10^{-6}$ to 0.05.

21. The phosphor of claim 19 wherein w is from $1\times10^{-6}$ to 0.025.

22. The phosphor of claim 19 whereto x is from $1\times10^{-4}$ to $7\times10^{-4}$.

* * * * *